United States Patent Office 3,450,658
Patented June 17, 1969

3,450,658
GELATINIZABLE AQUEOUS SOLUTIONS OF POLY(ETHYLENE OXIDE) RESIN AS SIZING FOR TEXTILE FIBERS
Charles R. W. Morison, Ossining, N.Y., assignor to Union Carbide Corporation, a corporation of New York
No Drawing. Filed Jan. 11, 1966, Ser. No. 519,947
Int. Cl. C08g 51/24, 43/00; D06m 15/44
U.S. Cl. 260—29.2           11 Claims

ABSTRACT OF THE DISCLOSURE

A gelatinizable aqueous solution consisting essentially of water from 0.5 to 20 percent by weight of a poly(ethylene oxide) resin having a molecular weight of at least about 50,000 and at least one salt having an ion selected from the group consisting of ammonium ions, and multivalent anions containing only non-metallic elements.

This invention relates to novel poly(ethylene oxide) compositions and to their use as sizing agents. More particularly this invention is concerned with gelatinizable aqueous solutions of high molecular weight poly(ethylene oxide) compounds and to their use in the sizing of fibers such as glass fibers.

Poly(ethylene oxide) compounds are well known materials which are highly soluble in water due to the association of water molecules with the ether oxygen atoms along the polymer chain. For an aqueous solution of any given poly(ethylene oxide) compound there is a temperature at which virtually all of the polymer comes out of solution due to a schism of the association bonds between the water and the oxygen atoms. The temperature at which this phenomenon occurs is commonly referred to as the "cloud point." As the term implies, a solution which is heated to a temperature above its cloud point becomes cloudy or milky in apperance because of the formation of many distinct, minute floccules of the poly(ethylene oxide) compound. Upon cooling to a temperature below the cloud point the floccules are again dissolved and the solution becomes water clear. It is known in the art that certain inorganic salts such as sodium chloride effect a lowering of the cloud point but the poly(ethylene oxide) which comes out of solution at the critical temperature is nonetheless in the form of many distinct floccules. It is also known that the addition of a salt having both a polyvalent metal cation and monovalent anions to an aqueous solution of a poly(ethylene oxide) compound having a molecular weight ranging up to about 2000 leads to the formation of a complex in which the salt loses its chemical identity. These complexes are useful for gelling a variety of organic liquids when incorporated therein.

Poly(ethylene oxide) compounds having molecular weights in excess of 20,000 have been suggested for use as the primary ingredient in sizing formulations for textile materials. Although these size materials possess many desirable attributes such as film integrity and flexibility and good lubricity, their use has been limited by their tendency to migrate during drying. For example, it is common in the glass fiber industry to apply a forming size to the glass filaments as they are being wound into bundles of filaments or "packages" immediately after their formation. Because the packages are so constructed that they dry only from the surface, the water must diffuse from the inner part of the package to the surface before it evaporates. Unfortunately, poly(ethylene oxide) compounds used as sizing agents migrate with the water and are deposited near the surface resulting in a non-uniform size. This obviously defeats the very purpose for which the size was applied and ultimately leads to low quality goods.

It is an object of this invention to provide gelatinizable aqueous solutions of high molecular weight poly(ethylene oxide) compounds.

It is also an object of this invention to provide novel aqueous solutions which can be reversibly gelled by a mere change in the temperature thereof.

It is a further object of this invention to provide a process for the sizing of textiles such that the problem of migration is substantially overcome.

A further object of the invention is to provide a process for the sizing of glass fibers with a gelatinizable aqueous solution of a high molecular weight poly(ethylene oxide) compound.

These and other objects of the invention will be apparent from the following description and claims.

In accordance with one aspect of the invention there are provided novel aqueous solutions of poly(ethylene oxide) resins and one or more of certain salts described more fully hereinafter. We have discovered that these solutions will reversibly gel at certain temperatures depending upon the particular poly(ethylene oxide) resin and salt used and their concentrations. The lowest temperature at which a given solution will form a gel is referred to herein as the "temperature of gelation" or "gelation temperature." At temperatures in excess of the gelation temperature the composition remains as a gel. Upon cooling to a temperature below the gelation temperature, the composition reverts to a fluid. The gelatinous material obtained at or above the gelation temperature is translucent and is uniform throughout in contrast to the cloudy appearance caused by the floccules obtained in cloud point determinations.

The poly(ethylene oxide) resins which can be used in the novel solutions of this invention must have a molecular weight which is sufficiently great that a continuous, flexible film can be prepared therefrom. Any of the poly(ethylene oxide) compounds which are known to be useful as the primary sizing agent in a textile sizing formulation can be satisfactorily employed. The poly(ethylene oxide) resins will generally have molecular weights of at least 50,000 although lower molecular weight resins can also be advantageously formulated. Those resins having molecular weights of from 75,000 to 1,000,000 are particularly preferred inasmuch as they provide a good balance between solution viscosity and the integrity of the gel.

Poly(ethylene oxide) resins suitable for use in this invention are well known compounds and can be prepared in accordance with the processes described in British Patent No. 839,171, U.S. Patent No. 2,969,402 and U.S. Patent No. 3,127,358. Many suitable compounds are commercially available materials such as the Polyox resins sold by the Chemicals Division of Union Carbide Corporation.

The concentration of the poly(ethylene oxide) resin in the solution is not narrowly critical and will depend, in part, upon the molecular weight of the particular resin employed, the desired gelation temperature and the solution viscosity permitted by the available equipment. As the resin concentration is increased, the temperature of gelation will decrease and the solution viscosity will increase. In general, the concentration can be varied from 0.5 weight percent to 20 weight percent based on the weight of water used. It is preferred, however, to use concentrations of from 1.0 to 10 percent, more preferably, from 3.0 to 6.0 percent by weight.

The salts which can be used in preparing the gelatinizable solutions of this invention are those having ions selected from the group consisting of ammonium ions and multivalent anions containing no metallic element. The preferred salts are the ammonium salts of multivalent anions. Simple inorganic salts, particularly those having sulfate or phosphate anions, are highly preferred. Mixtures of the suitable salts can also be used.

Illustrative of the salts which are contemplated for use in the solutions of the invention are diammonium phosphate, disodium hydrogen phosphate heptahydrate, monosodium phosphate, ammonium sulfite, aluminum sulfate, ferric ammonium sulfate, cupric sulfate, sodium sulfate, magnesium sulfate, sodium potassium tartrate, diammonium citrate, ammonium carbonate, ammonium chloride, ammonium acetate and ammonium citrate. Particularly preferred salts include diammonium phosphate, disodium hydrogen phosphate heptahydrate, aluminum sulfate, cupric sulfate, sodium sulfate and magnesium sulfate.

The concentration of the salt in the solution will vary depending upon several considerations. As a general rule an increase in salt concentration will lead to a lower temperature of gelation and, consequently, the desired temperature of gelation is a primary factor in determining the salt concentration. The concentration will also depend upon the particular salt or salts employed. For example, a solution containing 5 percent by weight of a poly(ethylene oxide) resin and 4 percent by weight of diammonium phosphate will gel at about 58° C. If, however, cupric sulfate is used as the salt, gelation occurs at about 15° C. Of course, a mixture of the salts will lead to an intermediate gelation temperature. It will be readily apparent, therefore, that the optimum concentration must be ascertained by routine experimentation following the choice of a particular salt or salts to be used and the determination of the desired gelation temperature. The decomposition temperature of the salt must also be considered when determining what concentration is to be used. Ammonium carbonate, for example, decomposes at temperatures in excess of 89° C. Accordingly, the concentration of such salts must be such that gelation will occur below the decomposition temperature unless the decomposition products exhibit a similar ability to produce a gel. When using a solution containing from 3 to 6 percent poly(ethylene oxide) resin it is preferred to use a salt concentration in the range of from 1.0 to 6.0 weight percent based on the weight of solution. Salt concentrations of from 2 to 4 percent are particularly preferred.

In preparing the solutions of this invention it is preferred to first prepare an aqueous solution of the poly(ethylene oxide) resin and to then add an aqueous solution of the salt to it. If desired, however, the poly(ethylene oxide) resin may be added to the salt solution. In the event that gelation occurs during the preparation of the solution, the composition need only be cooled until it reverts to a fluid.

At temperatures below the gelation temperature the viscosity pattern of a poly(ethylene oxide) solution is substantially unaffected by the presence of the salt. As the solution is heated a transition in phase will begin to take place at a temperature which is from about 1 to 5 centigrade degrees below the gelation temperature. At the gelation temperature the entire mass becomes a gel which becomes somewhat stronger as the temperature is further increased. Upon cooling, the composition again passes through a transition temperature range which may be somewhat lower than that observed in preparing the gel due to the loss of water by evaporation. Upon further cooling the composition will again become a readily pourable solution.

In another aspect of the invention the novel solutions described above have been found to be particularly suitable for use in the sizing of textile materials such as fibers, filaments, yarns and threads. In accordance with this aspect of the invention a gelatinizable aqueous solution of a poly(ethylene oxide) resin is applied to a textile material which is then heated to a temperature in excess of the temperature of gelation and dried. By operating in accordance with this method the problem of migration is substantially overcome. The water from the gel diffuses to the surface of the sized material where it evaporates but, in contrast to the experiences of the prior art, the poly(ethylene oxide) resin does not migrate with the water. Consequently, the textile material has a uniform protective coating which permits greater loom efficiencies and higher quality fabrics.

The textile materials which can be sized in accordance with the invention include synthetic fibers such as polyamides, polyesters, acrylics and modacrylics as well as natural fibers such as cotton and wool. Glass fibers such as those intended for use in draperies, curtains, tablecloths and the like are particularly suitable for use according to this method.

Any gelatinizable aqueous solution of a poly(ethylene oxide) resin capable of forming a continuous, flexible film having a tensile strength which is adequate for sizing applications is suitable as a sizing solution. The novel solutions discussed above are particularly suitable and the same considerations and preferments discussed in relation to the novel solutions are generally applicable in preparing the sizing solutions. The concentration of the poly(ethylene oxide) resin should be sufficiently high that a continuous film having a suitable tensile strength will be formed when the gel is dried.

The viscosity of the sizing solution can vary widely depending upon the equipment to be used, the fiber to be sized and the amount of size necessary to protect the fiber. The viscosity will generally range from about 10 to 1000 centipoises at 25° C. as measured by a Brookfield viscometer, spindle No. 2 turning at 20 revolutions per minute. It is preferred, however, that the solution have a viscosity of from 25 to 100 centipoise at 25° C. The viscosity can be increased by using a poly(ethylene oxide) resin of higher molecular weight or by merely increasing the concentration of the resin in the solution.

The solution can be applied to the textile material in any convenient manner. In the case of glass fibers it is preferred to immerse the fibers in the solution immediately after the fibers are formed. The fibers are then wound onto spools and heated or they can be heated prior to winding. The heating of the fibers can be accomplished by convection with heated air or preferably by the use of infrared rays.

The poly(ethylene oxide) film on the textile materials may be easily removed by a water wash. Where glass fibers have been sized the film may be burned off by a coronizing process. If the film is to be burned from the fiber, it is advantageous to employ a salt which will decompose into gaseous products so that no residues will be left on the fiber.

Various additives may be used in connection with the sizing solutions without encountering compatability problems. Wetting agents such as the polyethylene glycol alkyl ethers, lubricants and preservatives and other additives well recognized in the art can be employed in the sizing solutions as desired.

The following examples are illustrative of the invention and are not intended to be limiting in any way.

Example 1

Four 50 gram quantities of an aqueous solution containing 10 percent by weight of a poly(ethylene oxide) resin having a molecular weight of 50,000 were separated from a master quantity. Each of these quantities was diluted with an aqueous solution of disodium hydrogen phosphate heptahydrate to obtain solutions having the concentrations shown in Table 1 below. In like manner another solution, designated as Solution 5, was prepared wherein a poly(ethylene oxide) wax (Carbowax Compound 6000 available from Union Carbide Corporation) having a molecular weight of about 6000 was used instead of the resin used in the other solutions. In each case a slightly thickened solution was obtained. The temperature of each solution was increased. Each of the first 4 solutions formed a gel at the indicated temperature. Solution 5, however, formed no gel although cloud formation did occur.

TABLE 1

| Solution No. | Salt, wt. percent | Resin, wt. percent | Gelation temp., °C. |
|---|---|---|---|
| 1 | 8.0 | 5.0 | 45 |
| 2 | 4.0 | 5.0 | 74 |
| 3 | 2.0 | 5.0 | 91 |
| 4 | 1.0 | 5.0 | 99 |
| 5 | 4.0 | 5.0 | ¹54 |

¹ Cloud formation only.

This example illustrates the effect that the salt concentration has on the temperature of gelation and the necessity of using a resin which is capable of forming a continuous film possessing the desired tensile strength.

Example 2

Solutions 6 to 14 were prepared in the same manner as described in Example 1 except that different salts were used. The same poly(ethylene oxide) resin was used. The data for each solution is shown in Table 2.

TABLE 2

| Solution No. | Salt used | Wt. percent salt | Wt. percent resin | Gelation temp., °C. |
|---|---|---|---|---|
| 6 | Diammonium phosphate | 4.0 | 5.0 | 58 |
| 7 | do | 2.0 | 5.0 | 91 |
| 8 | do | 1.0 | 5.0 | 94 |
| 9 | Ammonium carbonate | 4.0 | 5.0 | 88 |
| 10 | Ammonium sulfite | 4.62 | 5.0 | 68 |
| 11 | do | 2.31 | 5.0 | 89 |
| 12 | Ammonium citrate | 4.0 | 5.0 | 85 |
| 13 | Ammonium chloride | 4.0 | 5.0 | 90 |
| 14 | Ammonium acetate | 4.0 | 5.0 | 89 |

Example 3

Solutions 15 to 22 were prepared in the same manner as described in Example 1 using a poly(ethylene oxide) resin having a molecular weight of about 150,000 and the various salts shown in Table 3. Each solution was heated in a completely enclosed container equipped with a thermometer until gelation took place and then it was cooled until the composition again become fluid. This temperature was noted and is referred to in Table 3 as the "Solution Temperature."

TABLE 3

| Solution No. | Salt used | Wt. percent salt | Wt. percent resin | Gelation temp., °C. | Solution temp., °C. |
|---|---|---|---|---|---|
| 15 | Aluminum sulfate | 4.0 | 5.0 | 68 | 66 |
| 16 | do | 6.0 | 5.0 | 5 | 4 |
| 17 | Ferric ammonium sulfate | 4.0 | 5.0 | 72 | 70 |
| 18 | Cupric sulfate | 4.0 | 5.0 | 15 | 12 |
| 19 | do | 2.0 | 5.0 | 67 | 65 |
| 20 | Sodium sulfate | 4.0 | 5.0 | 12 | 10 |
| 21 | Magnesium sulfate | 4.0 | 5.0 | 49 | 47 |
| 22 | do | 6.0 | 5.0 | 8 | 6 |

Example 4

A 10 percent solution of a poly(ethylene oxide) resin having a molecular weight of about 50,000 was prepared by stirring 5 grams of the resin with 45 grams of water at 25° C. While stirring the resin solution, a 30 percent solution of disodium hydrogen phosphate heptahydrate was added dropwise. Gelation occurred after 33 grams of the salt solution had been added. Five grams of water were then added and upon stirring a homogeneous liquid was again obtained. The temperature of the solution was next raised to 33° C. where the solution again set to a gel. As the temperature rose above 33° C. the gel became even stronger. The gel was cooled to 20° C. where, with stirring, the gel returned to a homogeneous liquid. A smooth film which was formed at 150° F. from a portion of the solution was characterized by the tensile strength desired for sizing applications.

Example 5

The sizing solution is prepared by slowly adding diammonium phosphate to a stirred aqueous solution containing 4 percent by weight of a poly(ethylene oxide) resin having an average molecular weight of about 150,000, 0.1 percent by weight of Ethomeen C/12 (an ethylene oxide adduct of an animated coconut oil available from Armour and Company), and 0.05 percent by weight of Tergitol TP–9 (a nonylphenyl ether of polyethylene glycol having a cloud point of 54° C. available from Union Carbide Corporation) until gelation occurs at a temperature of 35° C. The formulation is then cooled and charged to a sizing bath where the solution is maintained at 25° C. Approximately 124 filaments of glass having a composition and size suitable for use in the production of fibers are continuously drawn from a platinum head by a standard bobbin rotating at 9000 revolutions per minute. The sizing solution is applied to the filaments by drawing the filaments over a slowly rotating, hard rubber roll which is so positioned that the lower portion thereof is immersed in the sizing solution. The amount of solution applied to the filaments from the wetted roll is such that the weight of poly(ethylene oxide) resin taken up is about 3.0 percent of the weight of the filaments. The filaments are then passed through a ¼ inch eyelet traversing the bundle to insure uniform winding thereon. When the depth of the filament package reaches ½ inch, the bundle is transferred to an oven maintained at 40° C. where the sizing solution picked up by the filaments is gelled to prevent migration of the poly(ethylene oxide) during drying. The uniformly sized filaments of the bundle are then ready for further processing into thread and finally into high quality fabric.

What I claim is:

1. A gelatinizable aqueous solution consisting essentially of water, from 0.5 to 20 percent by weight of a poly(ethylene oxide) resin having a molecular weight of at least about 50,000 and at least one salt having an ion selected from the group consisting of ammonium ions and multivalent anions containing only non-metallic elements.

2. A gelatinizable aqueous solution as claimed in claim 1 in which the poly(ethylene oxide) resin has a molecular weight of at least 75,000.

3. A gelatinizable aqueous solution as claimed in claim 2 in which the poly(ethylene oxide) resin has a molecular weight of from 75,000 to 1,000,000.

4. A gelatinizable aqueous solution consisting essentially of water, from 1.0 to 10 percent by weight of a poly(ethylene oxide) resin having a molecular weight of from 75,000 to 1,000,000 and a gelatinizing amount of a salt having an ion selected from the group consisting of sulfate ions and phosphate ions.

5. A gelatinizable aqueous solution consisting essentially of water, from 3 to 6 percent by weight of a poly(ethylene oxide) resin having a molecular weight of from 75,000 to 1,000,000 and from 1.0 to 6.0 percent by weight of at least one salt having an ion selected from the group consisting of sulfate ions and phosphate ions.

6. A process for sizing textile materials which comprises applying a gelatinizable, aqueous solution consisting essentially of water, from 0.5 to 20 percent by weight of poly(ethylene oxide) resin having a molecular weight of at least about 50,000 and at least one salt having an ion selected from the group consisting of ammonium ions, and multivalent anions containing only non-metallic elements, to a textile material, heating the textile material to a temperature in excess of the gelation temperature of the aqueous solution, and drying said textile material at said temperature.

7. A process as claimed in claim 6 in which the poly(ethylene oxide) resin has a molecular weight of from 75,000 to 1,000,000.

8. A process according to claim 6 wherein the textile material comprises glass fibers.

9. A process for sizing glass fibers which comprises applying to a plurality of glass fibers an aqueous solution comprising water, from 3.0 to 6.0 weight percent of a poly(ethylene oxide) resin having a molecular weight of 75,000 to 1,000,000, and from 1.0 to 6.0 weight percent of at least one salt having an ion selected from the group consisting of sulfate ions and phosphate ions, heating said glass fibers until a gel is formed thereon, and drying said gel.

10. An article of manufacture which comprises a textile material which has been sized in accordance with the process claimed in claim 6.

11. An article of manufacture comprising glass fibers which have been sized in accordance with the process claimed in claim 9.

References Cited

UNITED STATES PATENTS

| | | | |
|---|---|---|---|
| 2,828,265 | 3/1958 | Van Strien | 252—315 |
| 3,090,701 | 5/1963 | Shulver et al. | 117—126 |
| 3,108,020 | 10/1963 | Van Derwilligen | 260—2 |
| 3,110,604 | 11/1963 | McConnaughay | 260—2 |
| 3,242,115 | 5/1966 | McGary | 260—29.2 |
| 3,249,569 | 5/1966 | Fantl | 260—2 |

SAMUEL H. BLECH, *Primary Examiner.*

J. T. GOOLKASIAN, *Assistant Examiner.*

U.S. Cl. X.R.

117—124, 126, 138.8, 141, 143; 260—2